Feb. 12, 1952  T. R. SMITH  2,585,863
SNAP-ACTION RELIEF VALVE
Filed April 1, 1946

INVENTOR.
Thomas R. Smith
BY
Parkinson & Lane
Attys.

Patented Feb. 12, 1952

2,585,863

UNITED STATES PATENT OFFICE 2,585,863

SNAP-ACTION RELIEF VALVE

Thomas R. Smith, Newton, Iowa, assignor to The Maytag Company, Newton, Iowa, a corporation of Delaware Application April 1, 1946, Serial No. 658,697

4 Claims. (Cl. 137—53)

1

The present invention relates to a relief valve and especially to one that assures positive sealing up to the point where the pressure in the system effects opening of the valve.

The invention comprehends a novel construction of relief valve that is positive in operation, and one which is readily adjustable for changing the amount of compression between a disc spring or diaphragm operating by snap action and a novel form of valve seat seal.

A further object of the present invention is the provision of a novel construction of relief valve which is self-sealing and which will maintain positive sealing regardless of the amount of pressure on the seal so long as the shut-off member or spring disc contacts the seal.

The invention further comprehends a novel valve assembly for a relief valve including a resilient sealing ring having an upstanding, annular lip against which a disc spring or shut-off member seats, the latter operating to close or open the port for discharge of the fluid being sealed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing—

Figure 1:
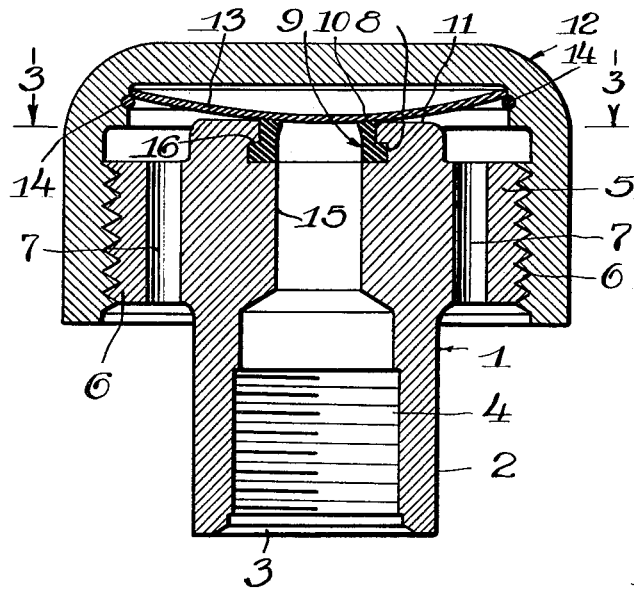
Figure 1 is a view in vertical cross-section through the novel construction of relief valve and showing the valve in closed position.

Referring more particularly to the drawing in which an illustrative embodiment of the invention is shown, the novel embodiment comprises a valve body 1 having a reduced end 2 provided with an inlet 3 and internally threaded at 4 for connection to a suitable fluid or hydraulic system. The upper portion of the valve body is provided with an enlarged part or head 5 threaded at 6 and provided with a plurality of suitably spaced vents or outlet openings 7 which may open

2 and vent to the atmosphere and a passage or opening 15 communicating with the inlet 3. The upper end of the valve body has a flat seating surface or upper edge 11 and the passage 15 terminates at this surface. This passage is enlarged and recessed at 8 to provide an undercut portion having a radially inwardly extending shoulder 16 intermediate the bottom of the recess 8 and the seating surface 11 and an annular surface concentric with but greater in diameter than the passage 15 extending upward from the shoulder 16 to the seating surface.

The recessed portion 8 is adapted to receive and retain an annular resilient sealing ring or element 9 of the self-sealing type formed of a suitable resilient material such as natural or compounded synthetic rubber. The sealing ring is formed with an annular lower enlarged portion or radially projecting flange conforming to the undercut portion and shoulder of the recess, an upper reduced portion whose outer diameter conforms to the annular surface in the body member and a sealing lip 10 which projects above the seating surface 11 of the valve body as clearly shown in Figs. 1 and 2. Also, it is formed with an inner annular opening or passage concentric or aligned with and of substantially the same diameter as the passage 15 through which the fluid is conducted, and the upper portion of this opening constitutes an outlet or discharge port for the passage 15.

It is obvious from the drawing that the fluid in or flowing through the passage 15 flows through the center of the sealing ring to the outlet. Also, the sealing ring is not physically secured to the valve body in any other manner except by the shoulder 16. Under normal operating conditions the fluid under pressure acts radially outward on the sealing ring to force it against the annular surface of the body member to thereby aid in holding the ring in position, and to act with the shoulder to prevent any fluid from escaping around the outer periphery of the seal and recess.

A valve cap 12 is internally threaded to receive the threaded periphery 6 of the body, and the upper end of the cap is dished or recessed in such manner as to receive and permit opening and closing of a metallic shut-off member such as a disc spring or the like 13, the periphery of which is held firmly in place by means of a snap ring 14 disposed below the circumferential edge of the shut-off member or disc spring and seating within a groove provided in the interior of the cap. The disc spring or shut-off member is preferably of a suitable metallic construction and is so formed as to operate by a snap action so as to automatically return to its original contour after being pressed substantially flat which occurs when the disc spring has been raised by a pressure exceeding that required to displace it from its normally closed position as in Fig. 1 to the open position shown in Fig. 2.

The disc spring or shut-off member 13 is so constructed and arranged that when in closed position it bears against the entire upper surface or periphery of the sealing lip 10 to compress the same, and contacts the upper edge or flat radial surface 11 of the metallic valve body 1. This metal-to-metal contact forms a positive stop and prevents further compression of the sealing ring 9. As the sealing lip extends somewhat beyond the end of the valve body, an initial compression endways on this sealing lip is obtained when the shut-off member or spring disc bears against the seal before the member or disc seats against the upper end or seating surface of the valve body. At the same time, the pressure of the fluid beneath the shut-off member or disc forces the sealing lip into the corner formed by the member or disc and the inside diameter of the upper end of the valve body, thereby giving a self-sealing action. Also, the fluid pressure acts radially outward on the remainder of the valve body and against the shoulder 16 to insure against leakage of fluid around the sealing member and to hold it in position.

The outer edge of the disc spring or shut-off member is held firmly in place by the snap ring 14 which prevents this edge from turning upward on the snap action which would in turn prevent the disc spring or shut-off member from returning to its normal closed position when the pressure is reduced.

One of the important advantages of the present novel construction is that positive sealing is maintained right up to the point where the disc spring or shut-off member snaps or moves into open or relief position, and thereby effecting instantaneous fully open and closed positions without the usual seepage or leakage near the point or predetermined pressure at which the valve is set to operate.

Figure 2:
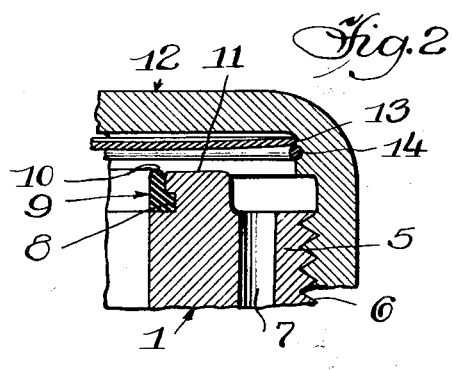
Fig. 2 is a fragmentary view of the construction shown in Fig. 1 but with the relief valve in open position.
Figure 3:
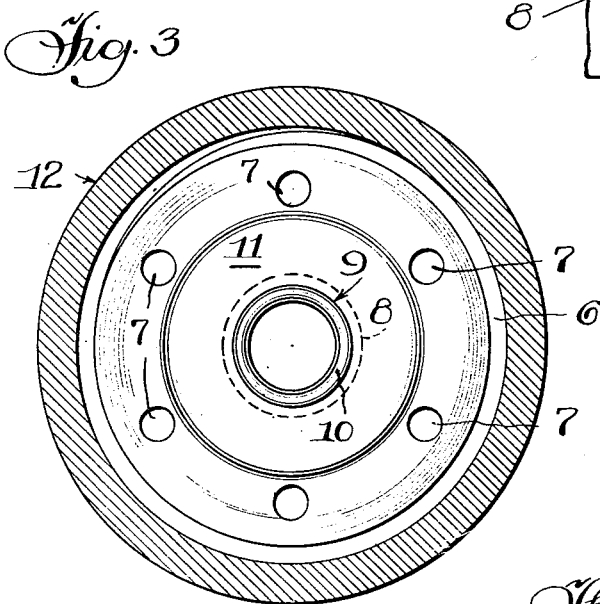
Fig. 3 is a view in horizontal cross-section taken in a plane represented by the line 3—3 of Fig. 1.

The disc spring or shut-off member 13 may be of any suitable metal which may be formed in the normal dished shape as shown in Fig. 1, for example, stainless steel, or it may be of any other suitable material or contour. Also, although the vents 7 may be open to the atmosphere, the present novel concept of valve may be employed in a hydraulic or fluid line or system where the vents or discharge ports may be but a continuation of the passage for the fluid in the conduit or line.

The present valve construction is simple in operation, positive in action, self-anchoring at all times and self-sealing regardless of the amount of pressure on the seal, so long as the disc or shut-off member contacts therewith. Also, the compression on the resilient sealing ring is limited at shut-off to prevent damage to the sealing lip. Suitable adjustment of the pressure at which the valve opens may be obtained by manipulation of the threaded cap 12.

Having thus disclosed my invention, I claim:

1. A snap action relief valve, comprising a valve body provided with a fluid passage and one or more outlets, a resilient sealing ring mounted on and forming a port of the passage, said sealing ring being provided with a sealing lip projecting above the adjacent surface of the valve body, a cap mounted upon the body, and a snap acting disc spring carried in the cap so as to continuously and positively seat and seal against the lip until the pressure below the disc builds up to the point where the disc is snapped into open position.

2. A snap action relief valve, comprising a valve body provided with a passage for fluid under pressure, and means for sealing said passage against the discharge of fluid until the pressure of said fluid reaches a predetermined amount, said means including a resilient seal mounted in the valve body and forming part of the passage and provided with a sealing lip extending beyond the adjacent surface on the body, a cap mounted upon the body, and an internally stressed over-centered disc spring mounted in the cap presenting a convex surface to the fluid and bearing against the periphery of the sealing lip.

3. In a snap action relief valve, a valve body provided with a passage for fluid under pressure, a resilient sealing ring mounted in the body and encompassing the discharge end of said passage, said sealing ring being provided with a sealing face projecting beyond the body, and a snap-acting metallic disc presenting a convex seating surface against the sealing face to effect positive and self-sealing action when the disc abuts the sealing face and with the adjacent surface of the body providing a stop against which the disc seats and thereby preventing further compression of the sealing ring.

4. A valve seal construction of the self-sealing type, comprising a body member having a passage therein for fluid under pressure with a seating surface surrounding the outlet end of the passage, said passage being enlarged adjacent the seating surface to provide an abutment thereberneath, an annular resilient self-sealing member having an opening therethrough forming a part of said passage in the body member and with its outer contour substantially conforming to the enlarged portion of the passage, said member being provided with an outwardly projecting sealing lip disposed adjacent the outlet end of the passage, and a snap acting single unitary metallic shut-off member disposed opposite the outlet end and adapted to first contact and compress the sealing lip to seal the outlet end and then engage the seating surface to thereby limit the compression on the sealing member, the sealing member being anchored against the abutment by the fluid pressure to prevent leakage of fluid about the outer contour of the sealing member.

THOMAS R. SMITH.

REFERENCES CITED

The following references are of record in the file of this patent:

UNITED STATES PATENTS

| Number | Name | Date |
| --- | --- | --- |
| 430,226 | Easton | June 17, 1890 |
| 1,334,507 | Shartle | Mar. 23, 1920 |
| 1,379,173 | Decrow | May 24, 1921 |
| 1,618,671 | Pick | Feb. 22, 1927 |
| 1,897,155 | Vaughn | Feb. 14, 1933 |
| 1,972,169 | Spencer | Sept. 4, 1934 |
| 1,989,199 | Hummert | Jan. 29, 1935 |
| 2,288,642 | Powell | July 7, 1942 |
| 2,322,139 | Kaelin | June 15, 1943 |
| 2,369,170 | Motsinger | Feb. 13, 1945 |
| 2,524,951 | Ashton | Oct. 10, 1950 |

FOREIGN PATENTS

| Number | Country | Date |
| --- | --- | --- |
| 857 | Great Britain | Mar. 3, 1877 |
| 12,911 | Great Britain | June 7, 1904 |